P. W. MURPHY.
CAM.
APPLICATION FILED MAY 2, 1917.

1,339,276.

Patented May 4, 1920.

Witness
Chas. W. Stauffiger
Charles Belg

Inventor
Peter W. Murphy,
By
Attorney

UNITED STATES PATENT OFFICE.

PETER W. MURPHY, OF DETROIT, MICHIGAN, ASSIGNOR TO THE MURPHY ENGINEERING CO., OF DETROIT, MICHIGAN, A CORPORATION OF MICHIGAN.

CAM.

1,339,276. Specification of Letters Patent. Patented May 4, 1920.

Application filed May 2, 1917. Serial No. 166,010.

*To all whom it may concern:*

Be it known that I, PETER W. MURPHY, a citizen of the United States of America, residing at Detroit, in the county of Wayne and State of Michigan, have invented certain new and useful Improvements in Cams, of which the following is a specification, reference being had therein to the accompanying drawings.

In the operation of cams in which they are the driven instead of the driving member, it is desirable that the phases of motion be obtained with as little back lash as possible, that the points or peaks of the cams be so disposed as to minimize the point where the thrust of the driving member becomes for an instant at least, *nil*, and also to devise means whereby the cam can be readily readjusted to its driving member or the latter more properly speaking rearranged in regard to it, to take up wear.

This invention relates to a cam for use as a driven member together with the driving member, arranged to provide for the accurate adjustment, continuous action and take-up for wear above referred to.

The invention consists in the matters hereinafter set forth, and more particularly pointed out in the appended claims.

Figure 1:
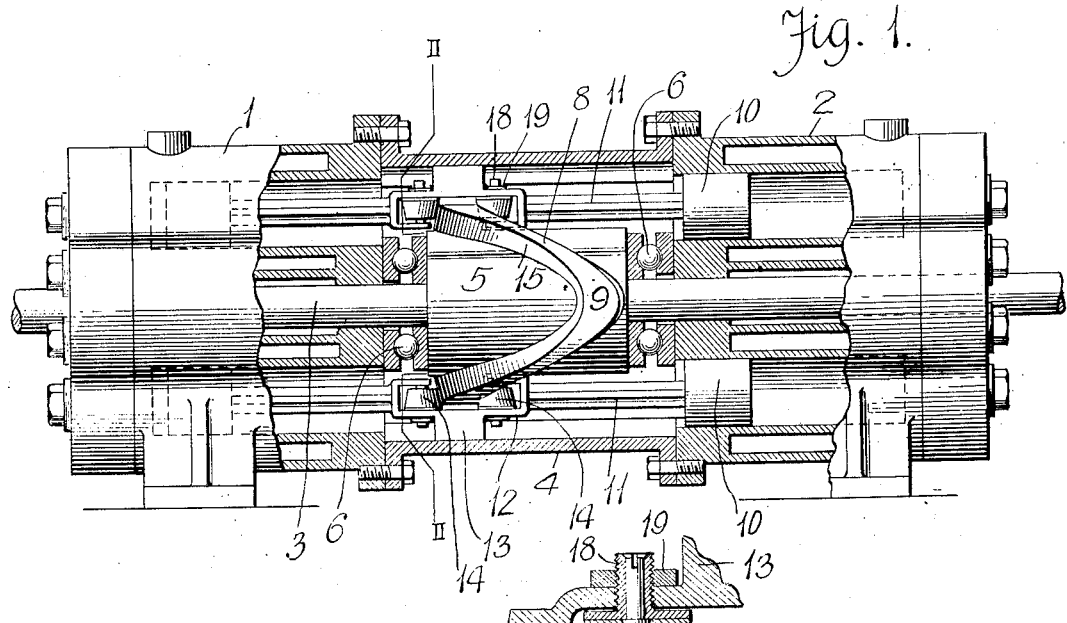
Figure 1 is a view, partially in side elevation and partially in section, of a cam with driving members therefor arranged for a multi-cylinder explosive engine as an example of the possible application of the device.
Figure 4:
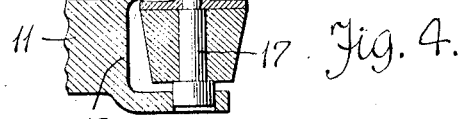
Fig. 4 is a view in detail of the take-up arrangement providing for wear.
Figure 3:
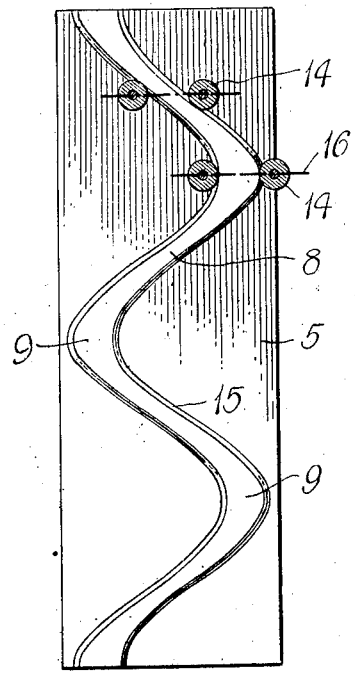
Fig. 3 is a view of the cam track developed.
Figure 2:
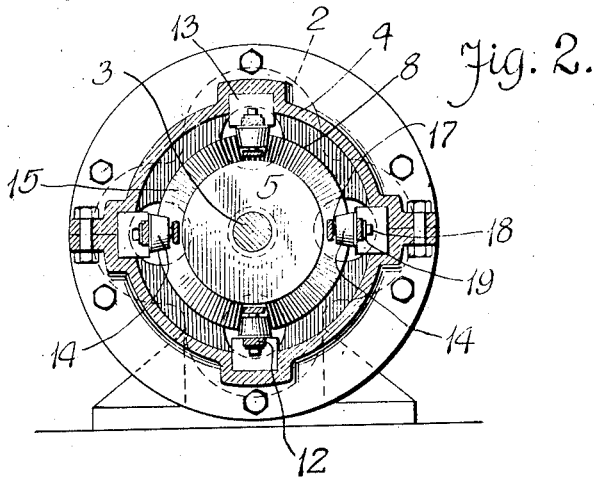
Fig. 2 is a view in section taken on or about line II—II of Fig. 1.

As herein shown, sets of oppositely disposed cylinders 1 and 2 are secured in alined relation and disposed symmetrically around a drive shaft 3. Suitable cross connections or guides 4 connect the cylinders and hold the same against the thrust of a cam 5 which is secured on the shaft 3 between antifriction bearings 6. The body 7 of the cam is cylindrical and has on its face a cam track 8 with alternating high points or peaks 9 connected by suitably curved and arranged portions.

The pistons 10 of the cylinders are connected by rigid stems 11, each of the latter having a central yoke portion 12 with guide lug 13 fitting the adjacent guide track. A pair of conoidal rollers 14 are mounted in the yoke portion 12 of the stem connecting each pair of pistons with the axes thereof radial with the shaft 3 and consequently perpendicular to the periphery of the body portion 5. The track of the cam is embraced by the rolls and the side faces 15 of the cam track are the planes traced by those elements of the conoidal rollers which when in contact with the sides of the contact are in radial planes to the periphery. As the space between the rollers remains constant while the angles of inclination of the lines 16 passing through the axes across the cam path with the cam track varies, the cam track itself varies, its greatest width being at the peak portion 9, and the narrowest width where the greatest obliquity occurs in the relation of the rolled line 16 of the path.

In order to take up between the rollers and the cam path, the latter are adjustable inwardly. As herein shown such adjustment may be obtained by mounting each of the rollers on a stud 17 secured in the bushing 18 that is movable into adjustment by means of screw threads a check nut 19 preventing displacement. The outer end or head of the stud 17 is preferably supported in a bearing in the yoke.

As a result of this construction a driven cam is obtained that moves readily under the reciprocation of the driving elements, that prevents tangential contact with the rolls that provides elongated bearing faces and wide metal parts to withstand the thrust as the cam rolls are traveling over the peaks and that is otherwise arranged to efficiently convert the reciprocation of the driving members into rotation.

Obviously changes in the details of construction may be made without departing from the spirit of my invention and I do not care to limit myself to any particular form or arrangement of parts.

What I claim is:—

1. A cam having a cylindrical body and a sinuous cam track with oppositely inclined faces, projecting from the periphery thereof, a cam driving member reciprocable in a plane parallel to the axis of revolution of the cam, conoidal rollers on the reciprocable member embracing the cam track and means for adjusting said rollers axially and radially to the cam body, said means comprising a bushing adjustable in said reciprocable member and a bearing stud secured to said bushing.

2. In a device of the character described, a cam having a sinuous cam track projecting therefrom, a reciprocable cam driving member provided with a yoke spanning the cam track, bearings on said yoke, studs adjustable in said yoke and supported by said bearings and rollers on said studs for engaging said cam track.

3. A cam having a cylindrical body with a peripheral sinuous cam track thereon with oppositely inclined faces, a cam driving member reciprocable in a plane parallel to the axis of rotation of the cam, provided with a yoke spanning the cam track, a pair of studs each axially adjustable in the yoke radially to the cam body and conoidal cam rolls each secured on a stud and adjusted axially with the stud to maintain contact with the proximate face of the cam track.

4. A cam having a cylindrical body, and a cam track sinuously disposed on the periphery thereof with oppositely inclined sides, a longitudinally reciprocable member parallel to the axis of the cam provided with a yoke spanning the cam track, with a pair of inner arms adjacent the periphery thereof, a pair of headed studs each carried by a bushing that is screwthreaded into the outer portion of the yoke, the heads of the studs being reciprocable in a guide opening in the inner yoke arm, and a conoidal cam roller carried by the studs between the head and bushing and maintained thereby in constant rolling engagement with the proximate face of the cam track.

5. In an engine having a cam member provided with a cam track and rollers for engaging said cam track, a reciprocable member, bushings adjustable in said member and roller carrying studs secured to said bushings.

6. A cam roller adjusting device comprising a supporting member, a bushing threaded in said member, a lock nut for said bushing and a roller supporting stud carried by said bushing.

In testimony whereof I affix my signature in the presence of two witnesses.

PETER W. MURPHY.

Witnesses:
  ANNA M. DORR,
  KARL H. BUTLER.